United States Patent Office 3,195,602
Patented July 20, 1965

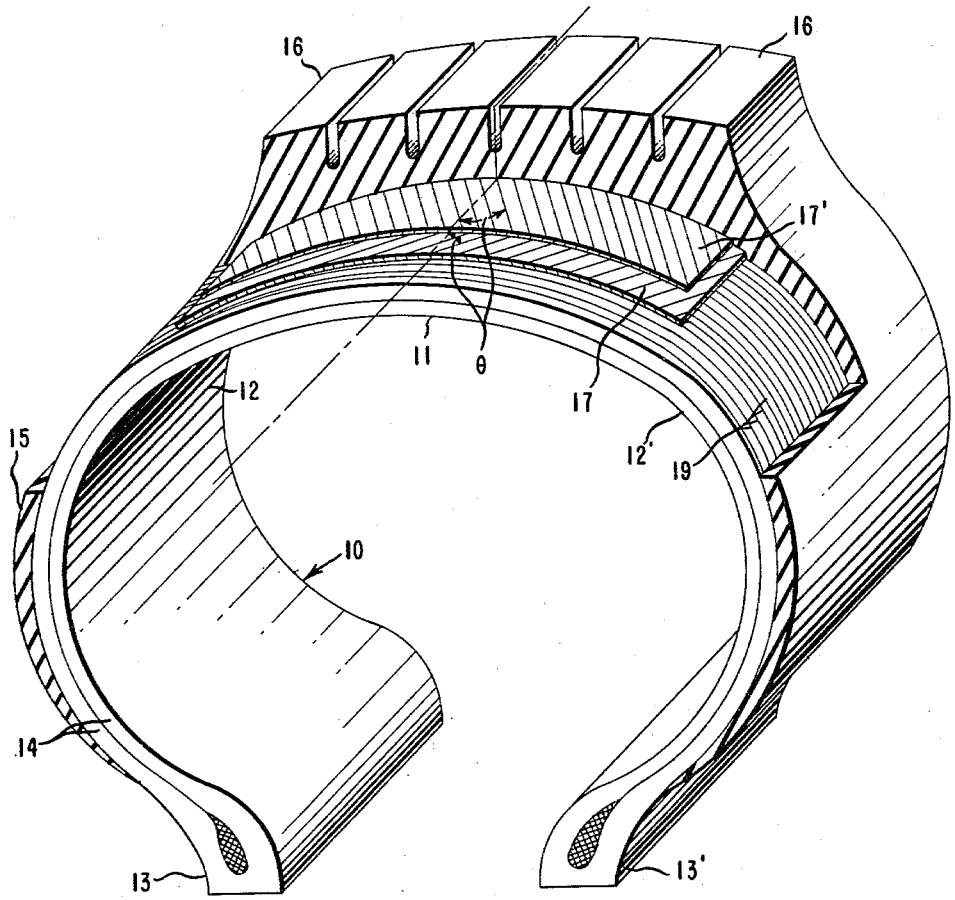

---

3,195,602
PNEUMATIC TIRE
Robert L. Keefe, Jr., Chadds Ford, Pa., assignor to E. I. du Pont de Nemours and Company, Wilmington, Del., a corporation of Delaware
Filed Feb. 27, 1963, Ser. No. 261,416
3 Claims. (Cl. 152—354)

This invention relates to pneumatic tires and deals more particularly with a belted pneumatic tire having an improved novel belt construction.

For the sake of prolonging the useful life of the tread of a tire, it has become common practice to insert in the tire structure a reinforcement belt located underneath the tread layer and above the rubberized fabric layer (the carcass) of the tire. Such belts are generally made up of one or more layers of parallel strands of inextensible cords, for instance steel wires, each embedded in elastomer material (e.g. rubber) and running in a complete circle or in a helix around the tire. In the dimension crosswise of the plane of the tire, the belt structure usually extends to a width less than the width of the tread. Several forms of such belts may be seen for instance in the drawings of U.S.P. 2,982,328 (Emanueli et al.).

Such belts do indeed prolong the serviceable life of a tire compared to that of a bias-carcassed tire which contains no belt, primarily because of the rigidity of the cincture belt. This rigidity minimizes the drag that accompanies the forward and reverse directions of the vehicle, and it is this drag that is the principal cause of tread-rubber wear. To soften the unavoidably-hard ride that is due to this rigidity, the carcass of a belted tire is generally formed with cords that lie substantially in radial planes, i.e., the planes which radiate from the tire's axis of rotation. Such carcass construction gives a significant amount of flexibility to the sidewalls of the tire but, at the same time, gives poor lateral stability. To overcome this instability, Emanueli et al. require that the cords for their tire, particularly, for the cincture belt, be substantially inelastic and, therefore, teach that these cords may be of steel. The preferred belted tires now in commercial use have steel cords in the belt. However, it is well known that shoulder failures are common in tires with belts of steel reinforcement members. To summarize, therefore, conventional belted tires have inextensible wire elements running circumferentially of the tire, and carcass cords (usually, also of wire) lying essentially in the radial planes of the tire. Such tires give a hard ride and poor cornering performance, and while they do result in a long tread life in the center of the tread, they give an unusually large number of failures in the shoulder area.

Accordingly, it is an object of this invention to provide a novel belted tire construction which gives a longer service life by effecting both lower tread wear and superior strength at the shoulder area of the tread. A further object is to provide a belted tire which gives superior cornering performance and good lateral stability.

Other objects and improvements of this invention will appear as the description proceeds.

The above objects are achieved in this invention primarily by the following two major changes in the construction of the belt.

(A) The elastomerized circumferential elements of the belt are made of extensible cords, for instance textile cords of twisted extensible filaments made of spinnable synthetic polymers, for instance polyamides, polyesters, cellulose esters or ethers, regenerated cellulose, vinyl polymers, acrylic polymers or hydrocarbon polymers.

(B) The width of the reinforcement belt is made larger, say at least 10% larger, than the width of the tread but not larger than the inner diameter of the tire cross section.

For a further understanding of this invention, reference is made to the accompanying drawing which represents a vertical section of a tire carcass in a radial plane, with part of the tread and shoulder area cut away to expose the belt structure and the strand reinforcements of the elastomerized fabric portion (carcass portion) of the tire.

In the sole figure of this drawing, 10 is the pneumatic tire in general, having a crown region 11, shoulder regions 12 and 12', bead zones 13 and 13', and comprising cord-reinforced carcass plies 14. The carcass is covered by an elastomeric sidewall 15 which is continuous with the elastomeric tread 16. This tread has been shown in the drawing to be cut away so that two layers, 17 and 17' of the wide belt of this invention, may appear in perspective with belt cords directed at a small angle $\theta$ with respect to the equatorial plane of the tire. Also shown are the carcass cords 19 located in planes which are approximately parallel with the radial planes of the tire.

Manufacture of a belted tire according to this invention may follow procedure which is per se common in the art. See, for instance, U.S. Patent 2,814,331 (M. Vanzo et al.). It is preferred for a tire of this invention that the belt be applied to the expanded carcass with stitching and that this belted tire be vulcanized without expansion into the curing mold, to avoid lateral contraction of the belt. For further clearness, the following procedure is given as an illustration, without any intent to limit this invention.

Taking a 2-ply, 8.50–14 tire as a convenient illustration, the tire is constructed by first forming on a rotatable, extensible drum, a cylindrical carcass comprising two plies containing parallel 840/2 cords, 35 ends per inch, which are constructed of filaments spun from polyhexamethylene adipamide. These cords, located in planes approximately parallel to, the radial planes of the tire, are encased in a conventional elastomer skim stock. The wire beads for the tire are located at each end of the cylinder, and the ply ends are turned around the beads and stitched, first one ply turned up and then the other ply turned down. Next, the carcass is expanded so that the mid-line at the crown of the carcass has a circumference of 73½ inches; and then a belt of 6 thin plies, 6½ inches wide, is centered on this circumference. Each belt ply contains parallel 840/2 cords, with an ultimate elongation of about 18%, 32 ends per inch, and constructed of filaments spun from polyhexamethylene adipamide. These cords, located in the plane of the belt so as to make an angle of 15° with the equatorial plane of the tire (but running in opposite directions in the two piles, as shown in the drawing), are encased in a conventional elastomer skim stock. On top of this belt is centered the combined tread and sidewall element of conventional elastomer material, the tread being 5½ inches wide. Tread element, belt, and carcass are stitched together by conventional stitching rollers. Then the formed tire is conventionally cured in a mold with a maximum mold section width of 8.2 inches and a mold section height, measured from the flat of the heel to the point of maximum mold radius, of 5.3 inches, to finally produce an 8.50–14 tire.

Tires constructed according to this invention have been found to possess a lower rate of tread wear, greater lateral stability, better cornering characteristics and a longer service life insofar as failure in the shoulder area is concerned. They also possess greater riding comfort than tires which possess a conventional belt in lieu of the wide belt of this invention.

When this specification speaks above of belt cords running essentially parallel to the equatorial plane and carcass cords lying essentially in radial planes, it will be understood, of course, that deviations from the specified positions within the limits normally practiced in the art cords in other important properties may be used provided that there is no reduction in ultimate elongation, which should preferably be between 10% and 25%.

As concerns the cord elements of the tire carcass in tires built according to this invention, these are also made of extensible cords which may or may not be of the same material, size, twist and other properties as the cords used in the belt; but this particular feature does not constitute an innovation, being in fact the customary practice in the art.

With the normal belt structure of this invention the belted tire now has both low tread wear, better cornering characteristics and improved lateral stability.

The thin, broad, tire belt of this invention makes it possible now to fabricate a textile belted tire for a truck, because that belt is now sufficiently reinforced with a textile material. The better riding qualities due to the more flexible textile cords place less stress and, therefore, effect less wear on the truck's suspension system. Another important advantage of this invention for a truck tire is the greater efficiency in power utilization gained by the truck because of the significant lessening of the drag which accompanies movement in the lateral direction as well as movement in the forward and reverse directions. Therefore, this invention gives the truck user lower fuel cost, lower tire cost and lower maintenance cost.

In addition to the fabrication of new tires for autos are permissible also in this invention. Thus, the radial cords (although parallel to each other throughout a given ply) may lie within any convenient angle not less than 70° with respect to the equatorial plane of the tire. In other words, they may make any angle between 0° and 20° with the radial planes of the tire. Radail cords in a carcass with paired plies are divergent, or opposite in direction, to the radial cords in the adjacent carcass ply.

The belt cords, on the other hand, are laid out in strict parallelism to the equatorial plane in belts wherein a single ply is used. But where the belt is made up of paired plies, the cords in each ply may again lie at any angle (θ in the drawing) not greater than 35°, and preferably not greater than 15°, with respect to the equatorial plane, provided that the acute angles made by the cords in a pair of plies with respect to the equatorial plane are equal in magnitude but opposite in the plus-minus sense; that is, the cords in two adjacent plies are divergent with respect to each other, and together cancel out any lateral stress component due to angular disposition of the cords.

It will be understood of course that where this specification speaks of cords made of twisted extensible filaments, the thought is to include cords made of twisted fiber, or continuous filaments of extruded synthetic polymers, which filaments, or fibers have already undergone the customary drawing (which is particularly noted in the case of nylon) whereby the fiber gains in length.

It is well known that the elongation properties of nylon cords may be controlled to some extent according to the number and size of yarns in the cord, the amount of twist applied, the amount of stretch, and the temperature and time used in pretreating the cords. Any variations in cord structure and treatment which will not damage the mobiles and trucks, this invention can also be used in the retreading of tires for automobiles and trucks, because, after the old tread is removed, a belt may be applied to the already expanded carcass.

Many additional modifications of this invention will be apparent to those skilled in the art and it is to be understood that this invention is not to be limited to the specific embodiments thereof, except as defined in the appended claims.

I claim as my invention:

1. In a pneumatic tire comprising a carcass and a tread portion, said carcass comprising elastomer-embedded, extensible, textile cords disposed essentially parallel to each other and at an angle not less than 70° to the equatorial plane of the tire and said tread portion being made of solid elastomer and including the tread proper, shoulder portions and sidewall portions in overlying contact with said carcass, a reinforcing belt disposed above the outer periphery of said carcass and underneath said tread, said belt extending circumferentially in a complete circle around the tire and extending laterally for a width not less than the width of said tread and not greater than the inner diameter of the tire cross section, said belt consisting of at least one ply of an endless elastomer ribbon having embedded therein a plurality of extensible textile cords which have an ultimate elongation of between 10% and 25%, said cords being disposed in parallel relation to each other and each running lengthwise of said ribbon.

2. In a pneumatic tire including carcass and tread portions, said carcass comprising elastomer-embedded, extensible, textile cords disposed essentially parallel to each other and at an angle not less than 70° to the equatorial plane of the tire and said tread portion comprising solid elastomer and including the tread proper, shoulder portions and sidewall portions in overlying contact with said carcass, a reinforcing belt disposed above the outer periphery of said carcass underneath said tread, said belt extending circumferentially in a complete circle around the tire and extending laterally for a width not less thna the width of said tread and not greater than the inner diameter of the tire cross section, said belt consisting of a single ply of an endless elastomer ribbon having embedded therein a plurality of extensible textile cords disposed in essentially parallel relation to said equatorial plane, each cord having an ultimate elongation of between 10% and 25%.

3. In a pneumatic tire including carcass and tread portions, said carcass comprising elastomer-embedded, extensible, textile cords disposed essentially parallel to each other and at an angle not less than 70° to the equatorial plane of the tire and said tread portion comprising solid elastomer and including the tread proper, shoulder portions and sidewall portions in overlying contact with said carcass.

a reinforcing belt disposed above the outer periphery of said carcass underneath said tread, said belt extending circumferentially in a complete circle around the tire and extending laterally for a width not less than the width of said tread and not greater than the inner diameter of the tire cross section, said belt consisting of at least one pair of plies, each in the form of an endless elastomer ribbon having embedded therein a plurality of extensible, parallelized, textile cords which have an ultimate elongation of between 10% and 25%, the cords in said pair of plies being disposed at substantially equal but opposite angles not greater than 35° with respect to said equatorial plane.

References Cited by the Examiner

UNITED STATES PATENTS

| 2,273,200 | 2/42 | Hoff | 152—359 |
| 2,331,323 | 10/43 | Jahant | 152—356 |
| 2,782,830 | 2/57 | Wallace | 152—361 X |
| 2,895,525 | 7/59 | Lugli | 152—354 |
| 3,074,455 | 1/63 | Richey | 152—356 X |

FOREIGN PATENTS

| 851,898 | 10/60 | Great Britain. |
| 859,749 | 1/61 | Great Britain. |

ARTHUR L. LA POINT, *Primary Examiner.*